United States Patent [19]

Suzuki

[11] 4,213,009
[45] Jul. 15, 1980

[54] SYSTEM OF CONNECTING A WIRE TELECOMMUNICATION AND A RADIO COMMUNICATION

[75] Inventor: Koro Suzuki, Tokyo, Japan

[73] Assignee: Whyte & Hirschboeck S. C., Milwaukee, Wis.

[21] Appl. No.: 957,435

[22] Filed: Nov. 3, 1978

Related U.S. Application Data

[63] Continuation of Ser. No. 852,822, Nov. 18, 1977, and a continuation of Ser. No. 678,045, Apr. 19, 1976.

[51] Int. Cl.² ............................................. H04Q 7/04
[52] U.S. Cl. .................................. 179/2 EA; 455/31; 455/42; 455/79
[58] Field of Search ........... 179/2 EA, 2 EB; 325/27, 325/47, 54, 55, 64, 65

[56] References Cited

U.S. PATENT DOCUMENTS

| | | | |
|---|---|---|---|
| 3,193,623 | 7/1965 | Burns et al. | 179/2 EA |
| 3,198,888 | 8/1965 | Lemelson | 179/2 EA |
| 3,366,880 | 1/1968 | Driver | 325/22 |
| 3,449,750 | 6/1969 | Sweigert | 179/2 EA |
| 3,522,536 | 8/1970 | Reynolds | 325/47 |
| 3,644,681 | 2/1972 | Rice | 179/2 EA |
| 3,754,187 | 8/1973 | Deming | 325/64 |
| 3,971,986 | 7/1976 | Hideshima et al. | 325/47 |
| 4,039,760 | 8/1977 | Gregory et al. | 325/55 |
| 4,119,800 | 10/1978 | Girardi | 325/22 |

Primary Examiner—Gerald Brigance

[57] ABSTRACT

A portable telephone assembly has a portable assembly and a base assembly each provided with a radio transmitter and receiver. The portable unit is operative to generate first and second frequency signals one of which is interruptable upon dialing. The base unit includes frequency responsive means operable to connect the base unit to a telephone line when both signals have been received and for interrupting and reestablishing the connection during dialing.

5 Claims, 4 Drawing Figures

SYSTEM OF CONNECTING A WIRE TELECOMMUNICATION AND A RADIO COMMUNICATION

This is a continuation of application Ser. No. 852,822, filed Nov. 18, 1977; a continuation of Ser. No. 678,045, Apr. 19, 1976.

BACKGROUND OF THE INVENTION

This invention relates to a system of connecting a wired telecommunication and a radio communication, wherein, more particularly, a portable telephone unit is provided with a radio transmitter and receiver and a base unit also having a transmitter and receiver is designed to be connected to a commercial telephone line. Such systems, however, suffer the disadvantage of being subject to interference from other radio systems employing the same frequency bands. Also, telephone systems employing radio transmission are subject to having unauthorized long distance calls placed through their base units by other portable stations.

SUMMARY OF THE INVENTION

It is the object of the invention to provide a portable telephone system employing radio transmission between a base unit and a portable unit wherein interference from other radio systems is minimized.

DETAILED DESCRIPTION OF THE INVENTION

Figure 1:
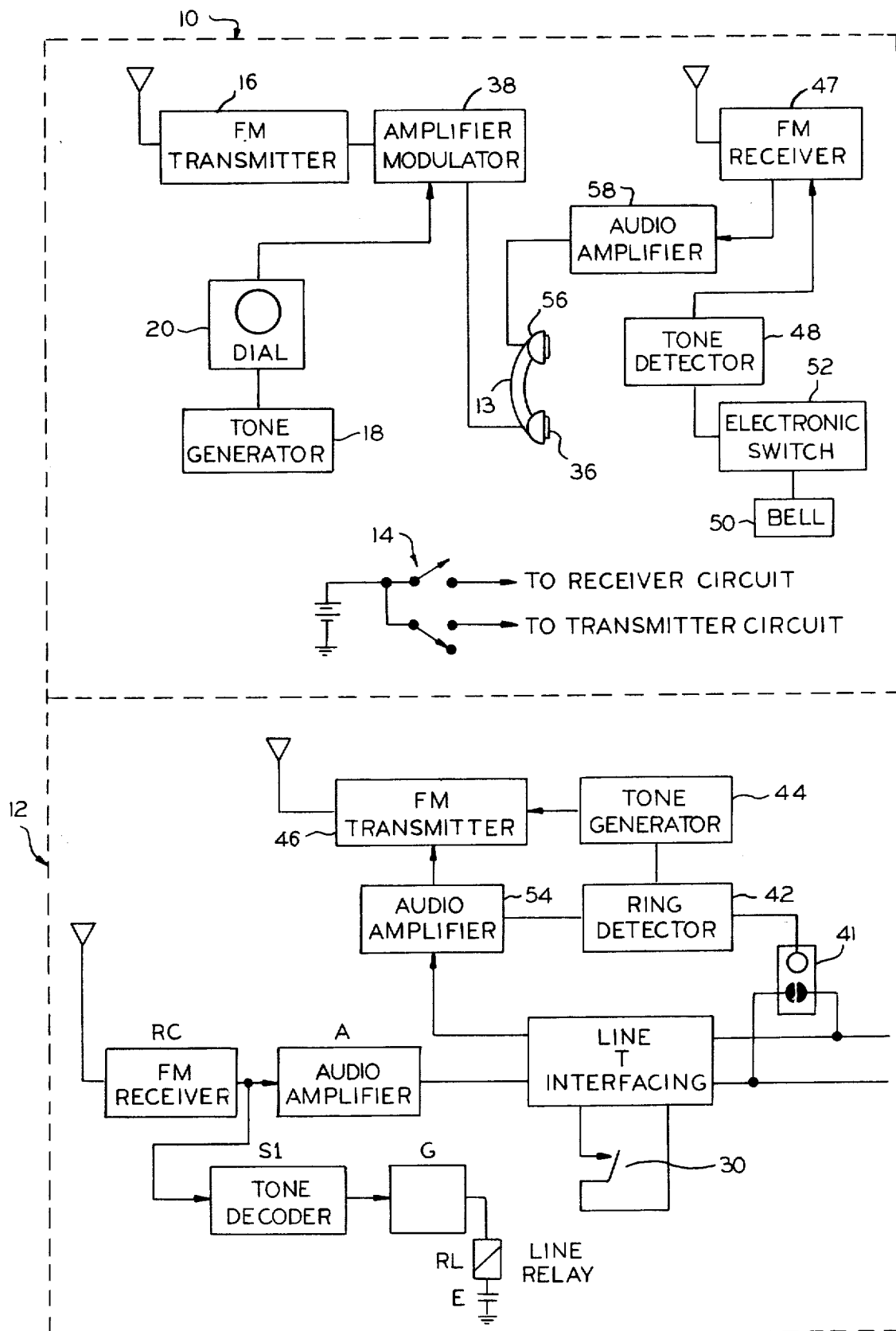
FIG. 1 shows a block diagram of a typical prior art system.

A typical prior art cordless telephone system is shown in FIG. 1 to include a portable unit 10 and a base unit 12. When the hand set 13 of the portable unit 10 is removed from its cradle (not shown), switch 14 closes to apply power to the transmitter 16 and tone generator 18. The transmitter 16 transmits a carrier, which may, for example, be 17 MHz and this signal is modulated by the tone from generator 18 applied through the interrupter contacts of a dial 20. As an example, the tone signal may be 5000 Hz. The frequency modulated signal from transmitter 16 is received by the receiver RC of base unit 12. The dialing tone is detected by the tone decoder $S_1$ coupled to receiver RC and which in turn actuates a line relay RL through a controller or gate G whereby line relay contacts 30 are closed to connect the base station 12 to the telephone line 32 through line interfacing circuit T which may be, for example, a hybrid transformer. When the portable unit dial 20 is dialed, the dialing tone is interrupted in accordance with the dial contacts repeated opening and closing whereby the energizing circuit to the line relay RL is similarly interrupted. In this manner, the contacts 30 open and close to provide dialing pulses to the line L. Voice transmission from the portable unit 10 is transmitted through handset transmitter 36, amplifier modulator 38, transmitter 16, and to the receiver RC of base unit 12 for amplification by audio amplifier A which is connected to line 32 through circuit 34.

When ringing voltage appears in telephone line L, any suitable circuit device responsive to ringing voltage, such as an opto-isolator circuit 41 couples a ring detector circuit 42 to line L for detecting peak voltage levels. The ring detector circuit 42 enables a tone generator 44 which in turn modulates the signal from the base unit transmitter 46. The base unit carrier wave will be transmitted at a different frequency than the portable unit, such as 27 MHz, for example, while the modulating signal may be 1700 Hz, for example. This modulated signal is transmitted to the portable unit receiver 47 for being sensed by the tone detector 48 which energizes a bell 50 through electronic switch 52. When the call is answered by lifting the portable unit handset 13 from its cradle, the line relay RL is energized as discussed above to close contact 30 thereby signaling the telephone line to remove the ringing voltage as in any normal telephone system. Simultaneously, the portable cradle switch 14 removes the supply voltage from the tone detector 48 and energizes the portable unit receiver 48 to accommodate normal voice communication. Voice communication received from telephone lines L is applied by line interfacing circuit 34 through audio amplifier 54 for modulating the signal from transmitter 46 and this transmitted signal is received by portable unit receiver 48 which is coupled to the handset receiver 56 through audio amplifier 58. Voice transmission from the handset transmitter 36 is summed with the tone from generator 18 in amplifier modulator 38 and this composite signal modulates the signal from transmitter 16 to produce wave propagation to the base unit receiver RC which is coupled to line L through audio amplifier A.

Figure 2:
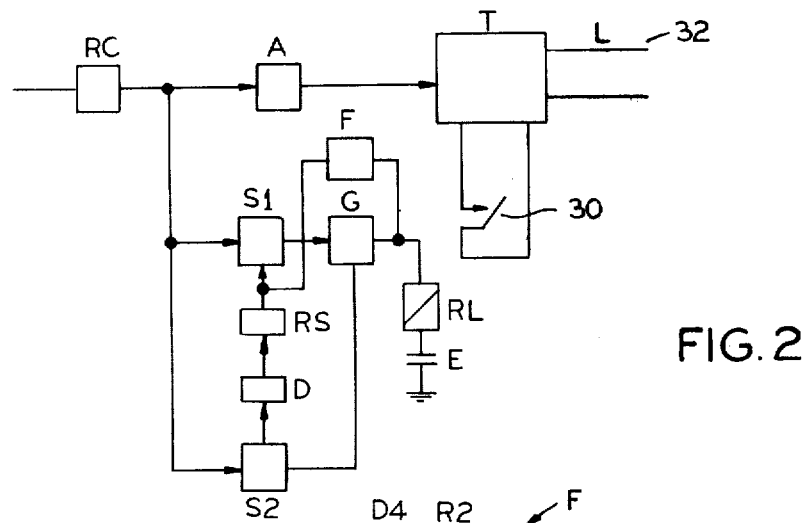
FIG. 2 shows block diagrams according to the present invention.

FIG. 2 shows a portion of the base station 12 which incorporates the present invention. In addition to the components of this portion of the circuit illustrated in FIG. 1, the embodiment of FIG. 2 includes a second tone detector circuit $S_2$, a delay circuit D and a reset circuit RS. The tone detector $S_2$ is similar to tone detector $S_1$ although it is preferably adjusted to detect a different tone signal than the tone detector $S_1$. It will be recalled that in the embodiment of FIG. 1, the tone generator 18 is coupled through dial 20 to the amplifier modulator 38 so that the tone signal from generator 18 is employed to modulate the carrier wave transmitted by transmitter 16. The portable unit employed with the embodiment of FIG. 2 would be substantially the same as that illustrated in FIG. 1 except a second tone generator (not shown) is connected directly to the amplifier modulator 38 while the first tone generator 18 is connected through the dial 20. Preferably, the two tone generators used in the portable unit to be employed in connection with the embodiment of FIG. 2 would be of a type capable of generating tone signals within a very narrow band, such as, for example, tuning fork reeds. These signals provided by the two tone generators would preferably be different frequency signals which would each modulate the carrier frequency. The detector $S_1$ is tuned so that it detects the first tone signal, that is the one not subject to dialing pulsing interruptions while the detector $S_2$ detects the tone signal associated with the dial 20. Accordingly, each of these tone signals is employed to modulate the carrier wave and is transmitted automatically when the portable unit handset is taken off its cradle to open the hook switch.

The gate G is preferably an AND gate such that when tone signals are detected by $S_1$ and $S_2$ the AND gate is operative to actuate relay RL which in turn closes contacts 30 so that the system is connected to the telephone line L.

A feedback circuit F is provided for maintaining the gate G in an enabled condition so that the line relay RL will remain energized should the signal to $S_1$ be lost. For this purpose, the delay circuit D and the reset circuit RS are provided for resetting the AND gate should the tone signal detected by both circuits $S_1$ and $S_2$ be interrupted. The interruptions of the signal detected by $S_2$ which is occasioned by dialing will cause opening and closing of the contacts 30 in the manner discussed with respect to FIG. 1.

Figure 3:
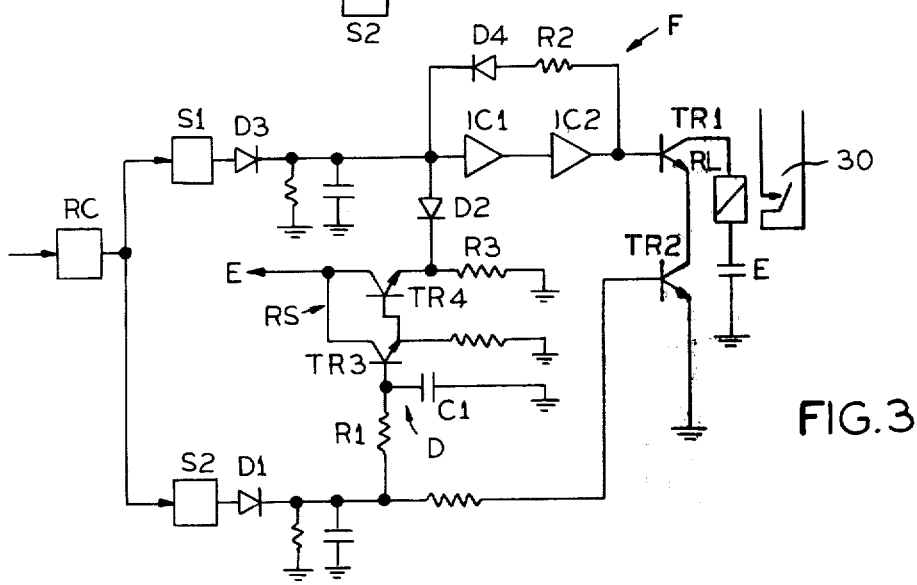
FIG. 3 shows the system of FIG. 2 in greater detail.

FIG. 3 shows the circuitry of FIG. 2 in greater detail. The gate G may comprise an AND gate consisting of transistors $TR_1$ and $TR_2$. When the first signal is detected by tone detector $S_1$, an output is provided through converters $IC_1$ and $IC_2$ to the base of transistor $TR_1$. If a second tone signal is detected by tone detector $S_2$, a positive signal is applied to the base of transistor $TR_2$. As a result, both transistors $TR_1$ and $TR_2$ become conductive to provide a signal to relay RL for closing contacts 30. If at this time, the $S_2$ signal is interrupted, such as occurs during dialing on the portable unit, the relay contacts 30 are interrupted so that the dialing pulses will be transmitted to line L in the manner discussed with respect to FIG. 1.

Because of the cascade connection of the $IC_1$ and $IC_2$ converter circuits and the feedback circuit consisting of resistor $R_2$ and diode $D_4$, once the output of $IC_2$ becomes positive, this output signal will remain even if the output of tone detector $S_1$ is interrupted. As a result, so long as an output signal exists from tone detector $S_2$, the relay RL will remain energized and communication to the telephone line L may continue. The signal $S_2$ may be, for example, about 5 KHz so as not to interfere with the lower voice frequency of telephone communication. The audio amplifier A, which is shown in FIGS. 1 and 2 but not in FIG. 3, is provided with a narrow band pass filter or phase synchronous circuit to eliminate the tone signal generated by the portable unit into which the tone detector $S_2$ is responsive.

As indicated above, the function of the reset circuit RS is to de-energize the relay RL when the tone signal to detector $S_2$ terminates. Specifically, when the output signal from tone detector $S_2$ ceases, the base voltage of transistor $TR_3$ disappears after a predetermined time delay dictated by the resistor $R_1$ and the capacitor $C_1$ of delay circuit D. On this event, the voltage of the junction of transistor $TR_4$ emitter and resistor $R_3$ disappears so that the input voltage of $IC_1$ becomes zero and the output voltage of $IC_2$ similarly goes to zero. In this manner, the converter circuit $IC_1$ and $IC_2$ is reset and will remain in this condition so long as a positive signal does not return to its input. The delay circuit D consisting of capacitor $C_1$ and resistor $R_1$ are provided so that the converter circuit is not reset when the $S_2$ input is pulsed or interrupted in the case of dialing. In this manner, during dialing the converter circuit is not reset so that the delay circuit restores the converter circuit only when the $S_2$ output had disappeared for a fixed time which is greater than the time between dialing pulses.

In the system illustrated in FIG. 3, the $S_2$ signal of about 5 KHz is applied constantly during a period of the telephonic communication, and therefore this signal sound may be disadvantageously leaked and heard in the telephonic communication in the event of poor performance of the eliminating filter of the receiving unit, component change or the other reasons. It will be appreciated that the $S_2$ tone signal and the carrier wave signal always exist simultaneously. Since the modulated 5 KHz wave signal never exists when the carrier wave does not exist, and because the 5 KHz signal always corresponds to the carrier wave signal, the carrier wave may be used instead of the 5 KHz signal without interference in the audio system. In addition, when the carrier wave is used instead of the 5 KHz signal, there will be no interference as the result of jamming and disturbance waves. First, when there is no telephonic communication between the portable telephone and the receiver when an interfering wave is received having approximately the same frequency to which the receiver RC is tuned, an output is produced in the tone decoder $S_2$. However, because the $S_1$ tone signal does not exist, so that the gate G is not operated, the interference is of no consequence. In the case where the interference signal is received during established telephonic communication, an output has been already produced in the tone detector $S_2$ in the manner indicated above so that the transistor $TR_1$ in FIG. 3 is in a conductive condition. Hereupon, even if the disturbing or interfering wave is further added, the operation of the $TR_1$ remains as it is, and again, no change is caused by the interference. The same results occur regardless of whether the disturbance wave is steady or intermitted.

It will be appreciated, therefore, that it is possible to use the carrier wave for the $S_2$ detected signal, and further this proposed system produces excellent results as will be described hereafter, in comparison with a system using the specific signal, for example, the 5 KHz wave modulating signal. Specifically, in considering the case where an interfering or disturbance wave exists, when the disturbance wave signal is especially large in the system using the 5 KHz wave modulation signal, the signal is suppressed, and the 5 KHz multiple restored signal is decreased so the transistor $TR_1$ in FIG. 3 may become nonconductive. In this case, undesirably the telephonic communication is not only interfered with but also the circuit may be cut off. However, as is apparent from the foregoing discussion, such an interference will have no effect in the system using the carrier wave. Furthermore, in this system, the additional tone generator in the portable unit 10 for the $S_2$ signal as well as the $S_2$ signal filter of the receiving unit audio amplifier A are not required, thereby reducing costs.

A disadvantage in using the carrier wave as the $S_2$ signal in the embodiment of FIG. 3 results from the fact that if a disturbance wave of about the same frequency as the carrier signal is received during dialing, misdialing will result. Specifically, when an output is produced in the selector $S_1$ by the first signal, the relay RL is operated to connect the system to the line. If, while the carrier wave, i.e. the $S_2$ output is intermitted during dialing, a disturbance wave is also received, an output is produced in the selector $S_2$ so that the $S_2$ output is not disconnected in response to the dialing, whereby a wrong number may be called or the dialing disabled.

Figure 4:
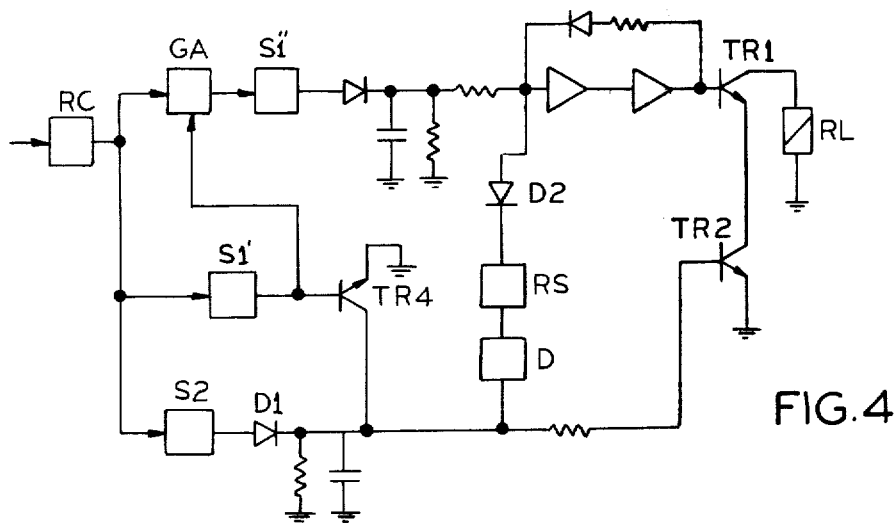
FIG. 4 schematically illustrates an alternate embodiment of the invention.

These defects are alleviated in the embodiment of the invention shown in FIG. 4. Here a pair of tone detection circuits $S_1'$ and $S_1''$ are provided in addition to the tone detector $S_2$. Detector $S_1''$ is connected to the radio receiver RC through a gate GA while the second tone detector $S_1'$ is connected to the radio receiver RC and to gate GA which is operative for a fixed time after receiving an enabling signal from detector $S_1'$. The signal received from the portable unit and which is initiated when the handset is elevated, consists of the carrier frequency modulated by a combined frequency signal with the detector $S_2$ tuned to the carrier frequency while the detectors $S_1'$ and $S_1''$ are each tuned to one of the frequencies of the combined modulating frequency signal. In addition, the frequency signal to which the detector $S_1$ is tuned is interrupted during dialing. Gate GA is of a type that remains conductive so long as an input exists once turned on by a triggering signal so that the signal to detector $S_1''$ will continue even though the signal from $S_1'$ is interrupted by the dialing operation.

When the portable unit handset is lifted from its cradle to provide the carrier frequency and the combined modulating frequency, the carrier wave is detected by $S_2$ which energizes transistor $TR_2$ while the first portion of the combined frequency is detected by $S_1'$ which enables gate GA so that tone detector $S_1''$ can detect the other portion of the modulating frequency to set transistor $TR_1$ whereby line coupling occurs in the manner discussed above. Transistor $TR_4$ is biased such that when a signal appears on the output of detector $S_1'$, transistor $TR_4$ becomes nonconductive. However, during dialing, the $S_1'$ portion of the modulating frequency is interrupted so that transistor $TR_4$ becomes conductive, thereby connecting diode $D_1$ to ground so that transistor $TR_2$ is turned off and the line contacts 30 are opened. Accordingly, whenever the interruption of the tone detected by detector $S_1'$ is interrupted, transistor $TR_2$ is turned off regardless of whether $S_2$ detects an interference signal. When the combined frequency portion of the signal is detected by $S_1'$ between dialing pulses or when dialing is completed, transistor $TR_4$ will be turned off so that transistor $TR_2$ may be turned on to complete line coupling. Accordingly, if the tone detector $S_2$ receives an interference signal during dialing, it will have no effect upon the dialing operation. Further, because gate GA will continue to provide the tone signal to $S_1''$ after initially being enabled by the signal from $S_1'$, the interruption of the $S_1'$ signal will have no effect on the operation of transistor $TR_1$.

Those skilled in the art will appreciate that the portable unit illustrated in FIG. 1 requires modification in a well-known manner when employed with the embodiment of FIG. 4 to provide the output signal consisting of a carrier wave and a modulating wave consisting of two frequencies in combination, one of which is interrupted during dialing.

While only a few embodiments in the invention have been illustrated and described, it is not intended to be limited thereby but only by the scope of the appended claims.

I claim:

1. A cordless telephone assembly including a portable assembly and coupling assembly for coupling the portable assembly to a telephone line, said portable and coupling assemblies each having a radio transmitter and a radio receiver for communicating with each other, said portable assembly being constructed and arranged to transmit a carrier wave and first and second modulating frequency signals applied to said carrier wave, means for intermittently interrupting said second modulating frequency signal in accordance with a signal interrupting sequence, said coupling assembly comprising:

first circuit means including line seizure means operative to connect said coupling assembly to said telephone line and gating circuit means connected to said line seizure means, second circuit means comprising first tone selective means operable in response to said first modulating frequency signal from said portable assembly for producing a first output signal, third circuit means comprising second tone selective means operable in response to said second modulating frequency signal from said portable assembly for producing a second output signal, said gating circuit means being connected to said second and third circuit means for receiving said first and second output signals and being operable in response thereto to actuate said line seizure means for connecting said coupling assembly to said telephone line whereby said coupling assembly operates to couple said portable assembly to said telephone line when said first and second modulating frequency signals are received by the radio receiver of said coupling assembly so that said coupling means will not be connected to said telephone line when an extraneous signal is received having either of said first or second frequency signals, said third circuit means being responsive to the interruptions of said second frequency signal by interrupting and reestablishing its output signal for disabling and enabling said first means in correspondence to said signal interrupting sequence and fourth circuit means coupled to said gating means for maintaining said gating means in an enabled condition when said first output signal disappears, reset means for resetting said fourth circuit means to disable said fourth circuit means when said second signal disappears, and delay means for delaying the operation of said reset means when said second signal is interrupted during a signal interrupting sequence.

2. The assembly set forth in claim 1 wherein the portable assembly includes first and second tone generators for generating said first and second modulating frequency signals, each of said tone generators including a tuning fork reed for generating said modulating signals within a narrow band.

3. The assembly set forth in claim 1 wherein said gating means includes first and second gate means wherein said line seizure means is operative to connect said coupling assembly to said telephone line when each of said gate means is in a predetermined state, said first and second gate means being respectively connected to said second and third circuit means for respectively receiving the first and second output signals therefrom, said gate means each being placed in its predetermined state upon receipt of said signals.

4. The assembly of claim 3 and including fourth circuit means coupled to said third circuit means and responsive to the output signal thereof for maintaining said first gate means in its respective predetermined state when said first output signal disappears, and fifth circuit means coupled to said third and fourth circuit means for delaying the disablement of said first gate means when said second signal disappears during a signal interrupting sequence.

5. The assembly set forth in claim 4 and including reset means for returning said first gate means to an alternate state when said second output signal disappears, and time delay means for delaying the operation of said reset means for a time longer than the time between signal interrupting pulses.

* * * * *